United States Patent [19]

Mitsuyu et al.

[11] Patent Number: 4,458,346
[45] Date of Patent: Jul. 3, 1984

[54] PICKUP STYLUS

[75] Inventors: Tsuneo Mitsuyu, Hirakata; Hisamitsu Maeda, Moriguchi; Kiyotaka Wasa, Nara, all of Japan

[73] Assignee: Matsushita Electric Industrial Co., Ltd., Kadoma, Japan

[21] Appl. No.: 319,279

[22] Filed: Nov. 9, 1981

[30] Foreign Application Priority Data

Nov. 17, 1980 [JP] Japan ................................. 55-162411
Nov. 17, 1980 [JP] Japan ................................. 55-162412

[51] Int. Cl.³ .................... C23C 15/00; G11B 11/06; H04N 5/76
[52] U.S. Cl. .................................. 369/126; 369/173; 204/192 C; 428/209
[58] Field of Search .............. 369/126, 109, 173, 151; 204/192 R, 192 C, 192 E; 428/209

[56] References Cited

U.S. PATENT DOCUMENTS 3,826,877 7/1974 Leedom et al. .
3,843,846 10/1974 Miller .
3,945,902 3/1976 Hawrylo et al. ............... 369/151 X
4,052,738 10/1977 Hosomi et al. .
4,104,832 8/1978 Keizer .
4,164,755 8/1979 Matsumoto .
4,165,560 8/1979 Matsumoto .

FOREIGN PATENT DOCUMENTS 53-91718 8/1978 Japan .

Primary Examiner—Robert L. Richardson
Attorney, Agent, or Firm—Cushman, Darby & Cushman

[57] ABSTRACT

A pickup stylus comprises a diamond stylus body having a rough surface and a conductive coating deposited onto said rough surface. The rough surface is made by ion bombardment process.

The pickup stylus is useful for information playback in video and/or audio disc system.

29 Claims, 8 Drawing Figures

F I G. 1
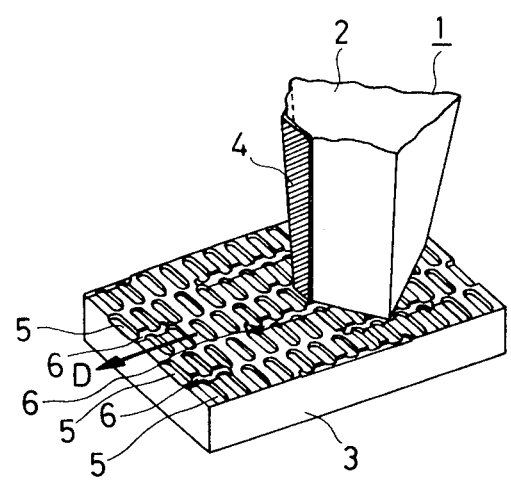
F I G. 2
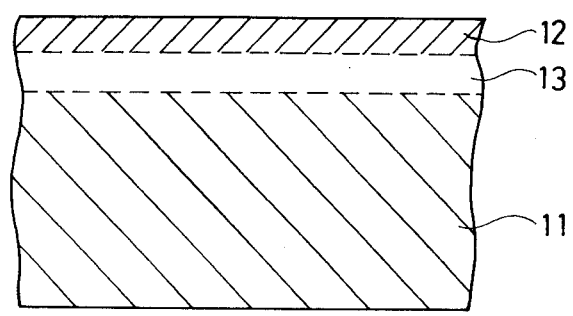

PICKUP STYLUS

BACKGROUND OF THE INVENTION

1. Field of the Invention:

The present invention relates to an improvement in a pickup stylus, especially for playing back in a capacity type video and/or audio disc player, and a process for making the pickup stylus.

2. Description of the Prior Art:

In the capacity type video and/or audio disc player, as is well known, a recording disc having a conductive part carrying signal thereon is used and a pickup stylus having an electrode thereon traces a fine spiral track on the disc, the track having a minute array of pits so that a capacity variation between the electrode on the pickup stylus and the conductive part of the disc is induced to produce an electric signal thereby.

For the stylus body, a diamond stylus is used because of its abrasion-durability, and the known pickup stylus has metal electrode which is formed on a mirror finished side face thereof by vapor deposition or the like. However, such a conventional pickup stylus has a shortcoming in that bonding of the metal electrode on the stylus body is not sufficiently strong, and therefore, the metal electrode is likely to peal off partly away from the diamond stylus body during the finishing process of the stylus or during use. When such peal off takes place, the manufacturing yield of the stylus falls down, or spoils the play back characteristic or further making the play back impossible.

SUMMARY OF THE INVENTION

The present invention purposes to provide a novel pickup stylus.

The present invention more particularly purposes to provide a novel pickup stylus for use in playing back a video and/or audio signal recorded on a capacity type recording disc.

The present invention can provide a pickup stylus whereon the electrode of a conductive material is strongly bonded.

The present invention can provide a method of manufacturing the pickup stylus, whereby a stable long life of good performance is obtainable with a high yield of manufacturing.

BRIEF EXPLANATION OF THE DRAWING

FIG. 1 is a general perspective view showing a part of a pickup stylus embodying the present invention and a part of a capacity type recording disc as an example of a disc, whereon the pickup stylus slides.

FIG. 2 is a schematic cross-sectional view of the pickup stylus embodying the present invention.

DESCRIPTION OF THE PREFERRED EMBODIMENT

Figure 3A:
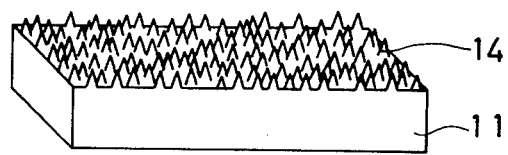
FIG. 3(a) is a perspective view of a part of the pickup stylus showing a step of manufacturing the pickup stylus embodying the present invention.

A pickup stylus in accordance with the present invention comprises a diamond substrate of stylus body and a conductive coating formed on a selected face of the diamond substrate,
characterized in that
the conductive coating is formed on the selected face with an interface layer inbetween, the interface layer having a roughened front of the diamond formed on the selected face and the substance of the conductive coating integral to the conductive coating and filled in concave spaces on said roughened front.

Method of manufacturing a pickup stylus in accordance with the present invention comprises the steps of
roughening a selected face of a diamond substrate by means of ion-bombardment, thereby forming a roughened face, and
forming a conductive coating on the roughened face.

There are two types of capacity type video and/or audio disc player. A first type is a system using a conductive disc having a spiral guide groove for guiding a pickup stylus thereon, and a second type is a system using a conductive disc which does not possess any guide groove but a pickup stylus is servo-controlled to trace a spiral track. The present invention is applicable to both of the above-mentioned first and second systems.

FIG. 1 is a perspective view showing principal part of an example of the second type system. A diamond substrate 2 of a pickup stylus 1 is substantially prism shaped. A cross section of the prism shaped stylus taken parallel to a face of the video disc 3 is of a pentagon-shape, which is made by obliquely cutting a corner of a square, thereby to make a short fifth edge 41. A vertical strip shaped face, which is defined by including the short fifth edge 41, forms an electrode face to which a metal electrode 4 is applied. The video disc 3 is driven in a manner that its part lying immediately under the stylus travels in a direction of a line normal to the electrode face, that is in the direction D. The end tip, which is the bottom face of the diamond substrate 2 is flatly finished so as to slide smoothly with respect to the video disc 3. The video disc 3 has a conductive surface layer at least on the upper surface thereof, and the conductive layer has a spiral row of a very large number of signal pits 5. Between the row of the signal pits 5, a spiral row of pilot pits 6 is formed. When the video disc is rotated, capacitance between the electrode 4 and the conductive layer of the video disc changes responding to the existence or non-existence of pits under the lower end of the electrode 4. By constituting an oscillation circuit comprising the capacitance as its resonance circuit, the change of the capacitance can be converted to frequency change of the oscillator output. The tracking control of the stylus along the track of the signal pits is attained, for example, by disposing rows of the pilot pits on both sides of the signal pit row in a manner to produce different pilot signal frequencies $f_1$ and $f_2$, comparing strengths thereof and controlling the tracking so as to obtain equal strengths for both pilot signals of frequencies $f_1$ and $f_2$.

The electrode 4 formed on the narrow strip shaped fifth face of pentagonal cross section prism stylus body 1 is bonded in a novel way as is elucidated hereunder.

FIG. 2 schematically shows cross section along the longitudinal direction of a part of the stylus 1, wherein the conductive layer, for example, vapor deposited metal film 12 is formed with an interface layer 13 on the diamond substrate 11 of the stylus body. The interface layer 13 comprises a surface treated layer of the diamond substrate. Experiments revealed that the surface treated layer preferably comprises a roughened diamond surface layer. The inventors found that the roughened layer gives an especially strong bonding force when the roughening work is made by a special process to form a very large number of needles on the surface instead of the known mechanical grinding of the diamond. Such a roughening process is hereafter elucidated referring to FIG. 3 and subsequent drawings.

Figure 3B:
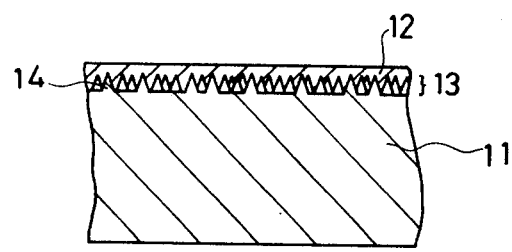
FIG. 3(b) is a cross-sectional view of a part of the pickup stylus of FIG. 3(a).

FIG. 3 is a perspective view showing a diamond substrate having a roughened face on a selected face. The roughened face is prepared by ion bombardment, preferably oxygen ion, on the selected diamond substrate. By such bombardment, the selected face is roughned to have a large number of needle-shaped protrusions 14 as shown by FIG. 3($a$).

Then, by means of sputtering a metal, for example Ti, on the roughened face having the protrusions 14, a metal layer 12 is deposited with an interface layer 13 consisting of the protrusions 14 of the diamond and sputtered front of the metal filled in the narrow spaces between the protrusions 14. It is confirmed that by forming such an interface layer 13 inbetween, the metal layer 12 is very strongly bonded on the diamond substrate 11.

Through experimental research, the inventors found that the thickness of the protrusion has an optimum range. That is, the preferable range of the size (width or diameter) of the protrusion at its trunk part or at the bottom part is from 0.01 $\mu$m to 0.5 $\mu$m. The protrusion should be arranged uniformly. When the size is within this range, for a vapor deposited metal film of Ti of 0.2 $\mu$m thick, the bonding force the Ti-film onto the roughened face of the diamond is above 5 kg/mm$^2$, which is larger than the bonding force by an ordinary epoxy adhesive. As the thickness or diameter becomes larger than 0.5 $\mu$m, the bonding force sharply decreases, and the surface of the vapor deposited metal electrode becomes rough making the stylus unusable. In the other direction as the thickness or diameter becomes smaller that 0.01 $\mu$m, the effect of the roughening of the diamond face is lost, sharply decreasing the bonding force lower than 100 g/mm$^2$, allowing the vapor deposited metal film to be easily pealed off from the diamond face by simply applying adhesive tape on the metal film to peal if off, resulting in loss of utility.

The length of the protrusions is important for attaining a strong bonding force. The preferable range of the length is from 0.01 $\mu$m to 0.5 $\mu$m, which is substantially equal to the thickness or the width of the protrusions. When the length is above 0.5 $\mu$m the surface of the diamond substrate as well as the vapor deposited electrode becomes too rough; and on the contrary when the length is shorter than 0.01 $\mu$m, the bonding force becomes to small making the stylus inactual unusable.

For the metal film to be vapor deposited on the selected face of the diamond substrate there may be used, other than the above-mentioned Ti, a metal having a suitable mechanical strength and corrosion-resistivity such as Ta, Nb, Hf, Zr, Cr, Mo, Ni, or W, and alloys of at least one of them, for example, titanium alloys such as Ti-Ni or Ti-Al-Mo, nitrides of the metals such as HfN or TiN, carbides of the metal such as TiC, silicide of the metal such as Mo-Si or ferro-alloys such as stainless steels. Such a conductive material can be formed on the roughened diamond stylus by means of, for example, sputtering. Preferably the thickness of the conductive film is comparable to the length of the protrusions 14. The inventors found by experiments that by selecting the thickness should be within the range from 0.01 $\mu$m to 1 $\mu$m, a practical metal electrode having a sheet resistance lower than 10 $\Omega$/□$\mu$m results. A stylus having such electrode is useful as a playback stylus for video disc or an audio disc of the capacitance type.

As a result of the experimental search on the thickness of the conductive film or coating 12, it is found that too large a thickness leads to pealing off of the conductive film from the diamond substrate. On the contrary, too thin of a coating leads to an undesirable increase of the sheet resistance of the conductive layer within its lifetime. It has been found that in order to obtain a long lifetime conductive film, the thickness should be from 0.05 $\mu$m to 0.2 $\mu$m.

In order to attain a satisfactory corrosion-resistivity, an over-coating forming a corrosion-prevention layer (not shown) on the electrode conductive film is applied. For such purpose, a noble metal such as Pt, Au, Ir or Rh, a stable compound such as SiC, a stable organic compound such as polyethlene, polyimido or polystyrene are preferable. Such a corrosion-prevention film should be of a thickness within the range of from 0.01 $\mu$m to 0.1 $\mu$m, and such film may be formed in a short time by sputtering. By providing a corrosion-prevention film, the electrode can be stably used without change of characteristics for a long time even in a rigorous atmosphere of a high relative humidity of over 80%.

According to the method and cosntruction in accordance with the present invention, a thermal diffusion process is not necessary after sputtering of the conductive electrode, in contradistinction from the conventional process where a thermal diffusion such as 800° C. to 1000° C. for 60 minutes has been necessary in order to increase the bonding force. For example, a strong bonding force of over 5 kg/mm$^2$ is obtainable in accordance with the manufacturing method of the present invention wherein a diamond stylus is made by grinding a small lump of diamond bonded on a metal shank to form a diamond substrate of the required shape, then after roughening a selected face of the substrate by oxygen ion bombardment the conductive electrode film is applied by sputtering in a cold temperature.

Figure 4:
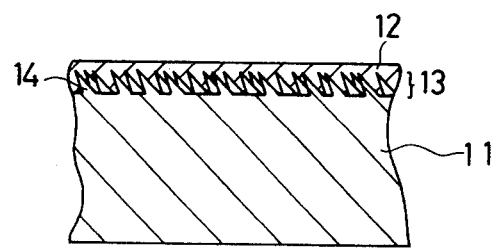
FIG. 4 is a cross-sectional view of a part of another pickup stylus embodying the present invention.

The direction of the protrusions 14 or needles formed on the substrate face is not necessarily normal to the substrate face as shown by FIG. 3($a$) and FIG. 3($b$), but may be oblique as shown by FIG. 4, provided that width or diameter and length thereof are within the aforementioned ranges and the protrusions are disposed uniformly on the face. It is confirmed that any angle of tilting of the protrusions 14 may be acceptable, and even the protrusions of such a tilting as having 8° to the substrate face is also effective in increasing the bonding force. Microscopic photographs taken by a scanning microscope have proved the existence of the very fine needle structure which has not been hitherto observed.

Figure 5A:
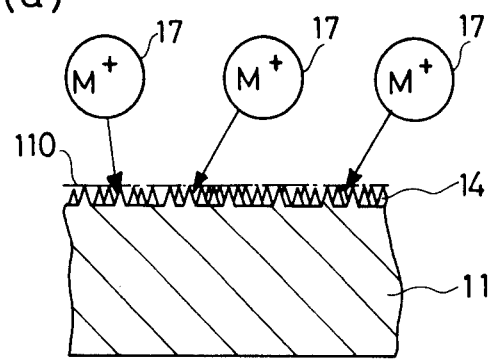
FIG. 5(a) is a cross-sectional view of a part of the pickup stylus showing a step of manufacturing the pickup stylus in accordance with the present invention.
Figure 5B:
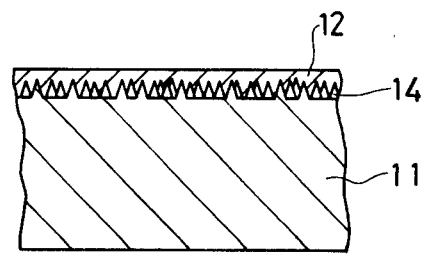
FIG. 5(b) is a cross-sectional view of a part of the pickup stylus showing a subsequent step of manufacturing the pickup stylus in accordance with the present invention.
Figure 6:
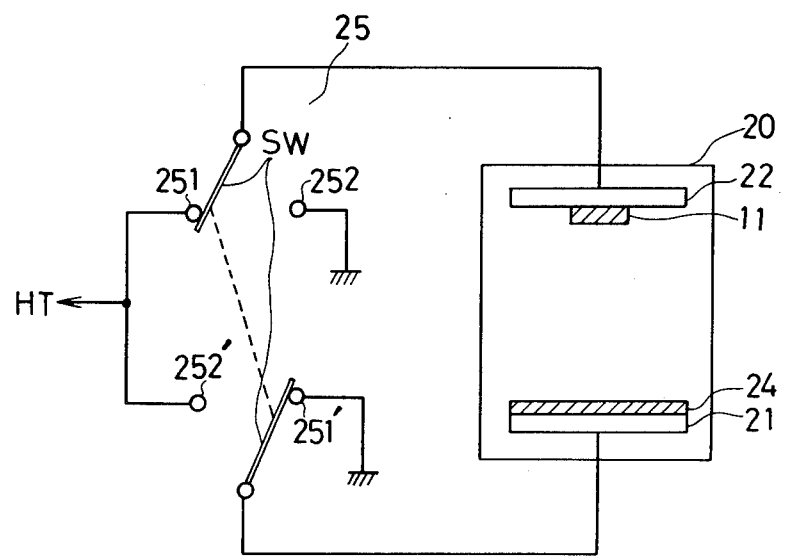
FIG. 6 is a circuit diagram and schematic sectional view of an apparatus for manufacturing a pickup stylus embodying the present invention.

Process of manufacturing in accordance with the present invention is elucidated more in detail referring to FIG. 5(a), FIG. 5(b) and FIG. 6 which show a fundamental example of manufacturing.

Firstly, the selected face 110 of the diamond stylus 11 is prepared by bombardment of ions 17 thereby to form a roughened face having needle shaped protrusions 14, as shown by FIG. 5(a). Secondly, the substrate is subjected to deposition of the conductive substance by, for example, sputtering, thereby to form the electrode of a conductive film 12 as shown by FIG. 5(b).

Through an intensive experimental research, the inventors found that selection of the ion used for the bombardment is very important in order to increase of the bonding force; and it is found that the oxygen ion is most suitable for this purpose. By use of oxygen ion bombardment, the bonding force of the conductive film on the diamond face becomes greater than 5 kg/mm$^2$. The reason is not necessary clear, but by a comparison test with Ar-ion bombardment, which is generally used to clear the substrate surface, the drastic roghening effect is confirmed only for the oxygen-ion bombardment. The Ar-ion bombardment does not increase the bonding force of the applied conductive film on the diamond surface as the oxygen-ion bombardment does.

It is believed that the oxygen ions, not only mechanically bombarding, but also chemically reacting with the carbon atoms at the surface part of the diamond substrate, accordingly form a considerable number of recesses on the bombarded surface thereby leaving needle shaped protrusions between the recesses, and the thus intensely roughened surface can retain sputter-formed surface coatings filled in the recesses.

The inventors found that the roughening process including the ion bombardment procedure can be most effectively carried but by sputtering. FIG. 6 is a schematical diagram showing an apparatus for manufacturing the pickup stylus in accordance with the present invention. Some actual examples of manufacturing the pickup stylus by use of the apparatus of FIG. 6 is elucidated hereafter.

EXAMPLE 1

First, the sputter etching for roughening the diamond substrate surface is made by the apparatus shown in FIG. 6, by throwing a linked switch SW to the side of the contacts 251 and 251', thereby applying a negative high tension voltage of, for example 1000 V, to a sample holder 22 which holds a diamond substrate 11 in an evacuated chamber 20, with respect to the main electrode 21 which holds a conductive material to be sputtered to form the stylus electrode. In this sputter etching process, oxygen gas of, for example $5 \times 10^{-2}$ Torr pressure, is lead in the chamber 20, thereby causing glow discharge start between the main electrode 21 and the sampler holder 22. Oxygen ions produced by the glow discharge bombard the surface of the substrate 11 and sputter-etches the surface part of the substrate to a depth of about 0.05 $\mu$m. The depth of the etching may be selected by selecting the etching time. After finishing the sputter etching, the switch SW is changed over to the side of the contacts 252 and 252', thereby applying the negative high tension voltage to the main electrode 21 and, also at the same time the gas in the chamber 20 is replaced by Ar. The material 24 to form the conductive electrode layer 12 held on the main electrode 21 is sputtered and deposited on the face of the diamond substrate 11. As has been elucidated, the thickness of the conductive layer 12 is important for attaining a strong bonding force to the diamond substrate 11, and for example, the conductive layer 12 is formed to have a thickness of about 0.1 $\mu$m and metalized by a known metalizing process. According to the method of the present invention, the sputter etching process and the subsequent metalizing process may be carried out in sequence without intermission inbetween. There is no need of heating the substrate to a high temperature, as the processes can be conducted for the substrate 11 at a room temperature in the chamber 20, and a satisfactory bonding force of 5 kg/mm$^2$ or above is obtainable.

For the material to form a conductive electrode, other than the above-mentioned Hf, a metal such as Ti, Ta, Nb, Zr, Cr, Ni, Mo or W, a alloy such as Ti-Ni or Ti-Al-Mo which contains at least one of above metals, a nitride such as HfN or TiN, carbibe such as TiC, a silicide such as MoSi or corrosion-resistive ferro such as stainless steel, is usable. Metalizing the above-mentioned electrode material on the diamond substrate is made by only holding such material on the main electrode 24 in the chamber 20, retaining other parts of the process the same. Alternatively, in the case nitride, carbide or silicide layers are formed as the electrode on the diamond substrate 11, it is possible by holding a metal such as Hf, Ti or Mo on the main electrode 21, and then carrying out a reactive sputtering in the subsequent sputtering by filling the chamber 20 with nitrogen, carbon-containing gas such as methane or acetylene or a silicon-containing gas such as silane.

The diamond substrate provided with the conductive layer formed with a strong bonding force on the substrate is especially suitable as a play back/pickup stylus in a capacitive type video disc system, since the substrate is resistant to subsequent grinding to make a pickup stylus wherein the conductive layer is ground to a strip as narrow as 1 $\mu$m width or less at the end tip part. Shaping of such in narrow conductive strip on the diamond stylus by the conventional method has been likely to produce unstability and irregularity of the strip electrode, leading to a poor bonding force of the strip electrode on the stylus substrate. However, in the example of the method of the present invention, the metal layer is very strongly bonded and is resistive to mechanical grinding even at a narrow width.

The advantage of the present invention is that the method can be applied even to a very minute construction of the diamond stylus substrate, since the ions having such small sizes of 1 to 10 Å are used for the pretreatment (roughening) of the substrate.

EXAMPLE 2

Firstly, the diamond stylus substrate is cleaned with an organic solvent. Then the substrate is put on a water-cooled anode in a high frequency sputtering apparatus. That is, the high frequency etching is made by an inverse sputtering where a negative high tension voltage is applied on the anode. The inverse sputtering is made with a high frequency power of 300 W in a mixed atmosphere of argon and oxygen (1 : 1 in mol ratio) of $3 \times 10^{-2}$ Torr for two minutes. Then after replacing the atmosphere to pure argon gas of $2 \times 10^{-2}$ Torr, another inverse sputtering is carried out for 2 minutes. Thus, needle shaped protrusions are uniformly formed on the selected face of the substrate 11. Subsequently, Hf lump put on a target electrode (or main electrode) in the chamber is sputtered in, using, a pure argon gas of $5 \times 10^{-3}$ Torr at a sputtering power of 45 W for 21 minutes, thereby forming a Hf conductive layer on the diamond stylus substrate 11. The thickness of the Hf electrode was 0.25 μm and the bonding force thereof is over 5 kg/mm². When the substrate is ground to make a play back pickup stylus of a video disc player as shown in FIG. 1, wherein the strip shaped conductive electrode 4 is less than 1 μm wide, the system shows a satisfactorily stable (constant) C/N ratio (carrier to noise ratio) even after continuous play back of 210 hours.

For the material to form a conductive electrode, other than the above-mentioned Hf, a metal such as Ti, Ta, Nb, Zr, Cr, Ni, Mo or W, an alloy such as Ti-Ni or Ti-Al-Mo which contains at least one of above metals, a nitride such as HfN or TiN, a carbide such as TiC, a silicide such as MoSi or a corrosion-resistive ferro-alloy such as stainless steel, is usable. Metalizing the above-mentioned electrode material on the diamond suitable to form the conductive electrode substrate is conveniently made by holding a material suitable to form the condutive electrode on the main electrode 24 in the chamber 20, retaining other parts of the process as the same. Alternatively, in case the nitride, carbide or silicide layers are formed as the electrode on the diamond substrate 11, it is possible by holding a metal such as Hf, Ti or Mo on the main electrode 21, and then carrying out a reactive sputtering in the subsequent sputtering by filling the chamber 20 with nitrogen, a carbon-containing gas such as methane or acetylene or a silicon-containing gas such as silane.

The diamond substrate provided with the conductive layer formed with a strong bonding force on the former is especially suitable for use for play back pickup stylus in a capacitive type video disc system, since the substrate is resistive to subsequent grinding to make a pickup stylus wherein the conductive layer is ground to a strip as narrow as 1 μm in width or less at the end tip part. Shaping of such a narrow conductive strip on the diamond stylus by the conventional method has been likely to produce instability and irregularity of the strip electrode, leading to a poor bonding force of the strip electrode on the stylus substrate. However, in the example of the method of the present invention, the metal layer is very strongly bonded and is resistant to mechanical grinding to such narrow width.

The advantage of the present invention is that the method can be applied even to a very minute construction of the diamond stylus substrate, since the ions having small sizes of 1 to 10 Å are used for the pretreatment (roughening) of the substrate.

EXAMPLE 3

Firstly, the diamond stylus substrate is cleaned with an organic solvent. Then the substrate is put on a water-cooled anode in a high frequency sputtering apparatus. That is, the high frequency etching is made by an inverse sputtering where a negative high tension voltage is applied on the anode. The inverse sputtering is made with a high frequency power of 300 W in a mixed atmosphere of argon and oxygen (1 : 1 in mol ratio) of $3 \times 10^{-2}$ Torr for two minutes. Then after changing the atmosphere to pure argon gas of $2 \times 10^{-2}$ Torr, another inverse sputtering is carried out for 2 minutes. Thus, needle shaped protrusions are uniformly formed on the selected face of the subtrate 11. Subsequently, Hf lump put on a target electrode (or main electrode) in the chamber is sputtered by reactive sputtering in a mixed gas consisting of argon and nitrogen (in the mol ratio of 1 : 1) of $5 \times 10^{-3}$ Torr at a sputtering power of 250 W for 5 minutes, thereby forming an HfN conductive layer on the diamond stylus substrate 11. The thickness of the HfN electrode was 0.2 μm and bonding force thereof is over 5 kg/mm². When the substrate is ground to make a play back pickup stylus of a video disc player, shown as in FIG. 1, Wherein the strip shaped conductive electrode 4 is under 1 μm wide, the system shows a satisfactorily stable (constant) C/N ratio (carrier to noise ratio) even after continuous play back of 300 hours.

What is claimed is:

1. A pickup stylus comprising a diamond substrate of stylus body and a conductive layer formed on a selected face of the diamond substrate, in which said conductive layer is formed directly on said selected face with an interface layer inbetween, said interface layer having a roughened front formed on said selected face of the diamond substrate and also having concave spaces on said roughened front filled with the conductive layer.

2. A pickup stylus in accordance with claim 1, wherein said roughened front comprises minute protrusions on said selected face.

3. A pickup stylus in accordance with claim 2, wherein said minute protrusions are of a needle shape.

4. A pickup stylus in accordance with claim 2, wherein the width of said protrusions are in a range from 0.01 μm to 0.5 μm.

5. A pickup stylus in accordance with claim 3, wherein the width of said protrusions are in a range from 0.01 μm to 0.5 μm.

6. A pickup stylus in accordance with claim 2, wherein the length of said protrusions are in a range from 0.01 μm to 0.5 μm.

7. A pickup stylus in accordance with claim 3, wherein the length of said protrusions are in a range from 0.01 μm to 0.5 μm.

8. A pickup stylus in accordance with claim 1, wherein said conductive layer is of a substance selected from the group consisting of Ti, Ta, Nb, Hf, W, Zr, Cr, Ni, alloys thereof, nitrides thereof, carbides thereof, silicides thereof and a stainless steel.

9. A pickup stylus in accordance with claim 2, wherein said conductive layer is of a substance selected from the group consisting of Ti, Ta, Nb, Hf, W, Zr, Cr, Ni, alloys thereof, nitrides thereof, carbides thereof, silicides thereof and a stainless steel.

10. A pickup stylus in accordance with claim 3, wherein said conductive layer is of a substance selected from the group consisting of Ti, Ta, Nb, Hf, W, Zr, Cr, Ni, alloys thereof, nitrides thereof, carbides thereof, silicides thereof and a stainless steel.

11. A pickup stylus in accordance with claim 4, wherein said conductive layer is of a substance selected from the group consisting of Ti, Ta, Nb, Hf, W, Zr, Cr, Ni, alloys thereof, nitrides thereof, carbides thereof, silicides thereof and a stainless steel.

12. A pickup stylus in accordance with claim 5, wherein said conductive layer is of a substance selected from the group consisting of Ti, Ta, Nb, Hf, W, Zr, Cr, Ni, alloys thereof, nitrides thereof, carbides thereof, silicides thereof and a stainless steel.

13. A pickup stylus in accordance with claim 6, wherein said conductive layer is of a substance selected from the group consisting of Ti, Ta, Nb, Hf, W, Zr, Cr, Ni, alloys thereof, nitrides thereof, carbides thereof, silicides thereof and a stainless steel.

14. A pickup stylus in accordance with claim 7, wherein said conductive layer is of a substance selected from the group consisting of Ti, Ta, Nb, Hf, W, Zr, Cr, Ni, alloys thereof, nitrides thereof, carbides thereof, silicides thereof and a stainless steel.

15. A pickup stylus in accordance with claim 1, wherein said conductive layer is further covered by corrosion-resistive film.

16. A pickup stylus in accordance with claim 2, wherein said conductive layer is further covered by corrosion-resistive film.

17. A pickup stylus in accordance with claim 3, wherein said conductive layer is further covered by corrosion-resistive film.

18. A pickup stylus in accordance with claim 4, wherein said conductive layer is further covered by corrosion-resistive film.

19. A pickup stylus in accordance with claim 5, wherein said conductive layer is further covered by corrosion-resistive film.

20. A pickup stylus in accordance with claim 6, wherein said conductive layer is further covered by corrosion-resistive film.

21. A pickup stylus in accordance with claim 7, wherein said conductive layer is further covered by corrosion-resistive film.

22. A pickup stylus in accordance with claim 8, wherein said conductive layer is further covered by corrosion-resistive film.

23. A pickup stylus in accordance with claim 9, wherein said conductive layer is further covered by corrosion-resistive film.

24. A pickup stylus in accordance with claim 10, wherein said conductive layer is further covered by corrosion-resistive film.

25. A pickup stylus in accordance with claim 11, wherein said conductive layer is further covered by corrosion-resistive film.

26. A pickup stylus in accordance with claim 12, wherein said conductive layer is further covered by corrosion-resistive film.

27. A pickup stylus in accordance with claim 13, wherein said conductive layer is further covered by corrosion-resistive film.

28. A pickup stylus in accordance with claim 14, wherein said conductive layer is further covered by corrosion-resistive film.

29. A pickup stylus in accordance with any one of claims 15 to 28, wherein said corrosion-resistive film is of a substance selected from the group consisting of Pt, Ir, Au, Rh, corrosion-resistive compounds, and a corrosion-resistive organic compound.

* * * * *